United States Patent
Sugahara

(10) Patent No.: US 6,760,292 B1
(45) Date of Patent: Jul. 6, 2004

(54) DISC RECORDER FOR RECORDING CODED DATA TO BE REPRODUCED IN REAL TIME AND METHOD OF DOING THE SAME

(75) Inventor: Takayuki Sugahara, Kanagawa-ken (JP)

(73) Assignee: Victor Company of Japan, Limited, Yokohama (JP)

(*) Notice: Subject to any disclaimer, the term of this patent is extended or adjusted under 35 U.S.C. 154(b) by 971 days.

(21) Appl. No.: 09/599,004

(22) Filed: Jun. 22, 2000

(30) Foreign Application Priority Data

Jun. 25, 1999 (JP) .......................................... P11-180573

(51) Int. Cl.[7] ................................................ G11B 5/09
(52) U.S. Cl. .............................. 369/53.31; 369/259.14; 369/47.3
(58) Field of Search ............................. 369/53.1, 53.12, 369/53.15, 53.16, 53.17, 53.24, 53.31, 53.34, 53.35, 53.36, 53.37, 47.18, 47.22, 47.27, 47.28, 47.3, 47.35, 59.13, 59.14, 59.23, 59.24, 59.26; 386/95, 125, 126

(56) References Cited

U.S. PATENT DOCUMENTS 5,325,347 A * 6/1994 Sako ........................ 369/47.3
6,078,727 A * 6/2000 Saeki et al. .................. 386/125
6,282,365 B1 * 8/2001 Gotoh et al. .................. 386/95
6,480,446 B1 * 11/2002 Ko ............................ 369/53.36
6,584,053 B1 * 6/2003 Tsukihashi ............... 369/53.34
6,625,094 B1 * 9/2003 Park et al. ............... 369/53.17

FOREIGN PATENT DOCUMENTS

| JP | 9-161399 | 6/1997 |
|----|----------|--------|
| JP | 10162506 | 6/1998 |
| JP | 11196374 | 7/1999 |

* cited by examiner

Primary Examiner—Thang V. Tran
(74) Attorney, Agent, or Firm—Nath & Associates PLLC

(57) ABSTRACT

A disc recorder is provided with: a reproduction peak rate detector for detecting a peak rate; a data recording start position detector for detecting a data recording start position; a data recording position manager and a defect position and length detector for detecting length of a discontinuous portion when real time reproduction data are suppositionally recorded on a disc medium; a continuous reproduction possibility determining unit for determining a possibility of continuous reproduction of the suppositionally recorded real time reproduction data; a copy manager for recording the real time reproduction data on the disc medium when it is determined that the suppositionally recorded real time reproduction data can be continuously reproduced; and a data recording position manager for changing the data recording start position when it is determined that the continuous reproduction is impossible.

8 Claims, 8 Drawing Sheets

DISC RECORDER FOR RECORDING CODED DATA TO BE REPRODUCED IN REAL TIME AND METHOD OF DOING THE SAME

BACKGROUND OF THE INVENTION

1. Field of the Invention

The present invention relates to a disc recorder which records coded data to be reproduced in a real time (hereafter, referred to as a real time reproduction data) on a recordable disc-like recording medium and a method of recording the coded data. More particularly, the present invention relates to a disc recorder which records the real time reproduction data having a variable transfer rate, for example, as a result of a compressing and encoding operation, together with another data, on a recordable disc-like recording medium, and a method of recording the data.

2. Description of the Related Art

Conventionally, coded data to be reproduced in a real time(real time reproduction data), for example, such as an audio data, a video data and the like, has been popularly recorded on a recordable disc-like recording medium (hereafter, merely referred to as a disc medium).

Here, in the real time reproduction data, its transfer rate is made variable, for example, as a result of a compressing and encoding operation, in many cases. One of the real time reproduction data having the variable transfer rate is picture data which are compressed and coded by so-called MPEG system.

MPEG will be described below.

The MPEG is detailed in ISO-IEC 11172-2, ITU-T H.262/ISO-IEC 13818-2. Here, it is schematically explained. The MPEG is an abbreviation of a name of an organization (Moving Picture Experts Group) for investigating a moving picture coding standard, which was established in ISO/IEC JTC1/SC2 (International Organization for Standardization/International Electro-technical Commission Joint Technical Commission 1/Special Commission 2, namely, a current SC29), in 1988. This MPEG system prescribes a compression method referred to as MPEG 1 (MPEG Phase 1) or MPEG 2 (MPEG Phase 2). The MPEG 1 (MPEG Phase 1) is a standard targeted for a storage medium of about 1.5 Mbps, and inherits the basic techniques of JPEG intended to encode a still picture and H.261 (standardized in accordance with CCITT, SGXV and a current ITU-T SG15) intended to compress a moving picture having a low transfer rate for a video conference and a video telephone in ISDN, thereby introducing new technology for the storage medium. They are established as ISO/IEC 11172 in August, 1993.

The MPEG is prepared by the combination of several techniques. In the MPEG, basically, a picture signal decoded by a motion compensation and prediction is subtracted from an input picture signal to thereby reduce a portion of a temporal redundancy.

There are three modes of direction of prediction as basic modes, namely, a mode to carry out a prediction from a previous picture, a mode to carry out a prediction from a future picture, and a mode to carry out a prediction from both previous and future pictures. Also, these modes can be switched and used for each macro block (MB) of 16 pixels× 16 pixels. The direction of prediction is determined in accordance with a picture type (Picture_Type) given to an input picture. There are three picture types, namely, Predictive-coded picture (P-picture), Bidirectionally predictive-coded picture (B-picture), and Intra-coded picture (I-picture). With regard to the P-picture (Predictive-coded picture), there are two modes of a mode to encode a current macro block by predicting based on a previous picture and a mode to independently encode a current macro block without the prediction. With regard to the B-picture (Bidirectionally predictive-coded picture), there are four modes, namely, a mode to carry out the prediction based on the future picture, a mode to carry out the prediction based on the previous picture, a mode to carry out the prediction based on both the previous and future pictures and a mode to independently encode without the prediction. With regard to the I-picture (Intra-coded picture), all macro blocks are independently coded. Since the I-picture stands for intra-coded picture, the Predictive-coded picture and the Bidirectionally predictive-coded picture can be called as non-intra-coded picture.

In motion compensation, a pattern matching is performed on motion areas for each macro block to thereby detect motion vectors at a half pel accuracy. Then, the prediction is done after the macro block is shifted by an amount corresponding to the size of the detected motion vector. The motion vectors contain a motion vector in horizontal direction and a motion vector in vertical direction. The motion vectors are transmitted as an addition information for a macro block together with a MC (Motion Compensation) mode indicative of a basement of the prediction.

Pictures between an I-picture and the next I-picture are referred to as GOP (Group Of Picture). One GOP typically includes about 15 pictures, when the abbreviation GOP is used in a field of storage medium., FIG. 1 shows the basic configuration of a video encoder for compressing and encoding video data, among MPEG encoders for compressing and encoding video data and audio data by using the MPEG system.

In FIG. 1, an input digital picture signal is sent to an input terminal 101. This input picture signal is sent to an arithmetic unit 102 and a motion compensation/prediction unit 111 as described later.

The arithmetic unit 102 calculates a difference between a picture signal decoded by the motion compensation/prediction unit 111 and the input picture signal. The differential picture signal is sent to a DCT(Discrete Cosine Transform) unit 103.

The DCT unit 103 performs an orthogonal transform on the sent differential picture signal. Here, DCT (Discrete Cosine Transform) implies an orthogonal transform in which an integral transform with a cosine function as an integral core is converted into a discrete transform to finite space. In the MPEG, a two-dimensional DCT is performed on a DCT block of 8×8 obtained by dividing the macro block into 4 sections. Typically, the video signal includes a large amount of low frequency components and a little amount of high frequency components. Therefore, the execution of DCT causes coefficients to be concentrated on the low frequency area. The data (DCT coefficients) obtained by the DCT unit 103 are sent to a quantizing unit 104.

The quantizing unit 104 quantizes the DCT coefficients from the DCT unit 103. In this quantization in the quantizing unit 104, the DCT coefficients are divided by quantization values, which are obtained by weighting a two-dimensional frequency of 8×8 referred to as a quantization matrix in accordance with visual characteristic and then scalar-multiplying the weighted values by a quantization scale. Meanwhile, when the coded data encoded by this video encoder are decoded and inversely quantized by a decoder (expanding and decoding apparatus) in future, values approximating to the original DCT coefficients can be obtained by multiplying the coded data by the quantization values used in the video encoder. The data quantized by the quantizing unit 104 are sent to a variable-length encoding (VLC) unit 105.

The VLC unit 105 performs variable length encoding on the quantized data from the quantizing unit 104. The VLC 105 encodes by using DPCM (Differential Pulse Code Modulation) that is one of predictive encodings, for direct current (DC) components of the quantized values. On the other hand, the VLC unit 105 performs on an alternating current (AC) components the so-called Huffman encode, which carries out a so-called zigzag scan from the low frequency area to the high frequency area, and then uses a run length of zero and values of effective coefficients as one event, and further assigns the events having higher occurrence possibilities with codes having shorter length. Also, information of a prediction mode and motion vectors is sent from the motion compensation/prediction unit 111 to the VLC 105. The VLC unit 105 outputs the information of the prediction mode and the motion vectors together with the variable-length coded data as the addition information of the macro block. The data after the execution of the variable-length encoding in the VLC unit 105 are sent to a buffer memory 106.

The buffer memory 106 transiently stores therein the variable-length coded data from the VLC unit 105. After that, the coded data (a coded bit stream) read out from the buffer memory 106 at a predetermined transfer rate are outputted from an output terminal 113.

On the other hand, the picture data quantized by the quantizing unit 104 are also sent to an inverse-quantizing unit 107.

The inverse-quantizing unit 107 inversely quantizes the quantization data from the quantizing unit 104. The DCT coefficient data generated by this inverse quantization are sent to an inverse DCT unit 108.

The inverse DCT unit 108 performs an inverse DCT on the DCT coefficient data from the inverse-quantizing unit 107, and then sends to an arithmetic unit 109.

The arithmetic unit 109 adds a predictive differential picture from the motion compensation/prediction unit 111 to an output signal of the inverse DCT unit 108. Accordingly, a picture signal is restored.

The restored picture signal, after transiently stored in a picture memory 110, is read out and sent to the motion compensation/prediction unit 111.

The picture signal sent to the motion compensation/prediction unit 111 from the picture memory 110 is used to generate a coded picture as a reference in order to calculate the differential picture in the arithmetic unit 102.

The motion compensation/prediction unit 111 detects the motion vectors from the input picture signal, and shifts the picture by an amount corresponding to the motion of the detected motion vector, and then carries out the prediction. The predictive differential picture signal generated by the prediction is sent to the arithmetic units 102, 109. Also, the motion vector detected by the motion compensation/prediction unit 111, together with the information of the prediction mode (MC mode), is sent to the VLC 105.

It should be noted that the coding of the differential picture as above-mentioned is performed only for P-picture and B-picture and that, with respect to I-picture, the input picture signal thereof is encoded as it is.

Here, the video coded bit stream outputted from the output terminal 113 has a code amount of a variable length for each picture. This is because the MPEG system uses the information transform, such as the DCT, the quantization and the Huffman encoding, and at the same time, adaptationally changes a code amount distributed for each picture in order to improve the quality of picture. This is also because, since the MPEG system performs motion compensation/prediction, the entropy of the coded picture itself is largely changed such that, in a certain case, the input picture as it is is encoded (a case of I-picture) while in other cases, the differential picture which is a differential of predictive images is encoded (cases of P- and B-pictures).

Thus, the encoder of FIG. 1 controls the code amount while complying with a limit of a buffer, in accordance with an entropy ratio of the coded picture.

That is, a code amount controller 112 in the encoder of FIG. 1 monitors a relation between the generated-code amount and a coding rate, sets a target code amount to be less than a predetermined amount of a buffer, feeds the target code amount back to the VLC unit 105, and also calculates an error code amount that is a difference between the target code amount and the generated-code amount for each macro block, generates a code amount control signal corresponding to the error code amount, and feeds back to the quantizing unit 104, and accordingly controls the generated-code amount. The code amount control signal fed back to the quantizing unit 104 for the sake of the control of the code amount is a signal to control the quantization value (the quantization scale) in the quantizing unit 104. For example, the quantization scale in the quantizing unit 104 is controlled to be large in order to decrease the generated-code amount, or it is controlled to be large in order to increase the generated-code amount.

In the MPEG standard, a virtual buffer memory referred to as a VBV buffer is prescribed such that in a decoding operation of a decoder (a video decoder), an occupation amount of a decoder buffer memory provided in the video decoder does not overflow or underflow. The generated-code amount in actual encoding is controlled in accordance with the occupation amount of the VBV buffer.

That is, the MPEG standard uses a VBV buffer model in which data are input into a VBV buffer at constant speed under a condition of an upper limit value of a maximum buffer capacity of a decoder buffer memory provided in the video decoder and when a predetermined amount of data is stored, the predetermined amount of the data is instantly decoded within a predetermined period of time (a unit of $1/29.97$ seconds, in a case of a video signal of NTSC). Thus, the MPEG standard prescribes that the coding is controlled such that the VBV buffer does not overflow or underflow.

Accordingly, the conformity to this standard (VBV buffer standard) enables a rate within the VBV buffer to be an apparently fixed transfer rate, although the rate is locally changed, if an observation time is made longer (namely, it is apparently encoded at a fixed coding rate). The MPEG standard defines such an apparently fixed transfer rate as a fixed rate.

FIG. 2 shows a transition example of a change in the occupation amount of the VBV buffer. A vertical axis of FIG. 2 denotes an occupation amount of a VBV buffer (the maximum capacity implies the MAX value), and a horizontal axis denotes a time. An inclination of a straight line indicative of the change in the buffer occupation amount of FIG. 2 corresponds to a transfer rate, namely, a coding rate.

That is, in FIG. 2, data are inputted into the VBV buffer at a constant transfer rate. The data are stored for $1/29.97$ seconds, for example, in the case of the video signal of the NTSC (National Television System Committee). After that, the data are instantly removed from the VBV buffer.

Additionally, the relation between the occupation amount of the decoder buffer memory provided in the video decoder and the occupation amount of the VBV buffer at the time of the encoding operation becomes inversely proportional. Thus, if the generated code amount is, for example, small in the case of the fixed transfer rate, the buffer occupation amount of the VBV buffer becomes at an overflow state, in which, in other words, the amount keeps to be the MAX value (the upper limit value).

As mentioned above, in the case of the fixed transfer rate, for example, if the generated code amount becomes small and thus the occupation amount of the VBV buffer becomes at the state in which the amount keeps to be the upper limit (the MAX value), the buffer occupation amount becomes small in the decoder buffer memory on the side of the video decoder. Thus, the underflow of the decoder buffer memory may undesirably occur.

For this reason, it is conventionally designed such that if the occupation amount of the VBV buffer reaches the upper limit, for example, an invalid bit is added into the coded bit stream so that the VBV buffer may not overflow, namely, the decode buffer memory of the video decoder may not underflow.

Also, the above-mentioned definition of the fixed transfer rate in the MPEG is expanded such that if the occupation rate of the VBV buffer reaches the upper limit, the video decoder stops reading out the data from the disc medium, and thereby the decode buffer memory of the video decoder may not underflow, namely, the VBV buffer may not overflow.

In addition, as mentioned above, when the generated code amount is, for example, very small to thereby result in the overflow of the VBV buffer (the underflow of the decode buffer memory), the above-mentioned control for adding the invalid bit into the coded bit stream is not required if the video decoder side stops reading out the data from the disc medium. Thus, in this case, the code amount may be controlled such that only the underflow of the VBV buffer does not occur.

FIG. 3 shows the basic configuration of the video decoder for decoding the coded data encoded by the video encoder shown in FIG. 1.

In FIG. 3, coded data read out directly from the encoder or read out from the disc medium is sent to an input terminal 121. The coded data are sent to a variable-length decoding (VLD) unit 122.

The VLD unit 122 carries out a variable length decoding implying the process reverse to the variable length encoding in the VLC unit 105 of FIG. 1. Data generated by the variable length decoding corresponds to data obtained by adding information of motion vectors and a prediction mode to quantization data that are the input to the VLC device 105 of FIG. 1. The quantization data generated by the variable length decoding in the VLD unit 122 are sent to an inverse quantizing unit 123.

The inverse quantizing unit 123 inversely quantizes the quantization data from the VLD unit 122. The inversely quantized data corresponds to DCT coefficients that are an input to a quantizing unit 104 of FIG. 1. The DCT coefficient data generated by the inverse quantization in the inverse quantizing unit 123 are sent to an inverse DCT unit 124. The information of the motion vectors and the prediction mode is sent from the inverse quantizing unit 123 to a motion compensation/prediction unit 127.

The inverse DCT unit 124 performs the inverse DCT on the DCT coefficients from the inverse quantizing unit 123. The data obtained by the inverse DCT in the inverse DCT unit 124 corresponds to a differential picture signal that is an input to a DCT unit 103 of FIG. 1. The differential picture signal obtained by the inverse DCT in the inverse DCT unit 124 is sent to an arithmetic unit 125.

The arithmetic unit 125 adds a predictive differential picture from the motion compensation/prediction unit 127 to the differential picture signal from the inverse DCT unit 124, which accordingly restores decoded data, namely, a picture signal. This restored picture signal substantially corresponds to an input picture signal to an input terminal 101 of FIG. 1. The restored picture signal (decoded data) is outputted from an output terminal 128, and simultaneously sent to the motion compensation/prediction unit 127 after transiently stored in a picture memory 126.

The motion compensation/prediction unit 127 generates the predictive differential picture from the picture signal sent from a picture memory 126, in accordance with the motion vectors and the prediction mode, and then sends the predictive differential picture to the arithmetic unit 125.

In the meantime, for example, when the data to be reproduced in a real time such as an audio data, a video data and the like (a real time reproduction data) are recorded on a recordable disc medium, the real time reproduction data are conventionally recorded after a continuous area on which the data can be recorded is reserved in advance in the disc medium.

However, for example, if another data have been already scattered and recorded on the disc medium, the continuous area where the real time reproduction data can be recorded can not be reserved in advance in the disc medium. Thus, there may be a case that it can not be recorded.

Also, for example, when defect caused by flaw and the like is present on the disc medium, the recording operation is done in which the defect portion is skipped. However, in this case, the physical arrangement of the real time reproduction data is discontinuous on the disc medium. Thus, in order to sufficiently absorb a time lag resulting from the discontinuous portion of the real time reproduction data, it is necessary to insure a transfer rate sufficiently higher than a transfer rate in the real time reproduction, namely, a sufficiently higher rotation speed of the disc medium.

Also, for example, at a time of recording on the disc medium a real time reproduction data, in which a transfer rate is made variable by the compressing and encoding operation such as the above-mentioned MPEG method, if the real time reproduction data are inputted to a disc recorder, for example, at a transfer rate equal to or greater than a particular rate, for example, if the real time reproduction data are inputted at a variable transfer rate including a high transfer rate with which the disc recorder can not cope, there may be a case that the continuous reproduction of the recorded data can not be insured. That is, when the real time reproduction data at the variable transfer rate are recorded on the disc medium, a data having the high transfer rate can not be recorded. As a result, if a part of the real time reproduction data is largely lost, the data can not be decoded at a time of a later decoding operation. This results in a problem that an error is largely propagated to thereby cause the data reproduction to be severely disturbed.

SUMMARY OF THE INVENTION

The present invention is proposed in view of the above mentioned circumstances. It is therefore an object of the present invention to provide a disc recorder and method, which when a real time reproduction data are recorded together with another data on a recordable disc medium, can surely record the real time reproduction data together with another data on the recordable disc medium, and can ensure the reproduction of the real time reproduction data, and can avoid the occurrence of the disturbance in the data reproduction.

In order to attain the above-mentioned object, according to an aspect of the present invention, there is provided a disc recorder for recording coded data to be reproduced in real time, on a recordable disc-shaped recording medium, the disc recorder comprising: a peak rate detecting means for obtaining coding rate information of the coded data to thereby detect a maximum coding rate that is a reproduction peak rate of the coded data; a recording start position detecting means for detecting a recording start position of the disc-shaped recording medium; a discontinuous length detecting means which, supposing that the coded data are recorded on the disc-shaped recording medium, detects a length of a discontinuous portion of the coded data that are suppositionlly recorded; a determining means for determining a possibility of continuous reproduction of the coded data that are suppositionlly recorded, based on at least information of the recording start position, the length of the discontinuous portion and the maximum coding rate; and a control means for recording the coded data on the disc-shaped recording medium when it is determined that the coded data that are suppositionlly recorded can be continuously reproduced as the determination result of the determining means and for changing the recording start position when it is determined that the coded data that are suppositionlly recorded can not be continuously reproduced.

Also, in order to attain the above-mentioned object, according to another aspect of the present invention, there is provided a disc recorder for recording coded data to be reproduced in real time, on a recordable disc-shaped recording medium, the disc recorder comprising: a peak rate detecting means for obtaining coding rate information of the coded data to thereby detect a maximum coding rate that is a reproduction peak rate of the coded data; a recording start position detecting means for detecting a recording start position of the disc-shaped recording medium; a discontinuous length detecting means which, supposing that the coded data are recorded on the disc-shaped recording medium, detects a length of a discontinuous portion of the coded-data that are suppositionlly recorded; a determining means for determining a possibility of continuous reproduction of the coded data that are suppositionlly recorded, based on at least information of the recording start position, the length of the discontinuous portion and the maximum coding rate; and a control means for recording the coded data on the disc-shaped recording medium when it is determined that the coded data that are suppositionlly recorded can be continuously reproduced as the determination result of the determining means and for rearranging recorded areas on the disc-shaped recording medium when it is determined that the coded data that are suppositionlly recorded can not be continuously reproduced.

According to the present invention, for example, in the case that real time reproduction data is to be recorded together with another data on a recordable disc medium, the real time reproduction data can be surely recorded together with another data on the recordable disc medium, and it is also possible to ensure the reproduction of the real time reproduction data, and further possible to avoid the occurrence of the disturbance in the data reproduction.

The preferred embodiment of the present invention further comprises a message output means for outputting a message indicating that the coded data can not be recorded, after the determining means has repeatedly determined a predetermined number of times that the coded data that are suppositionlly recorded can not be continuously reproduced.

According to this embodiment, for example, it is possible to avoid the trouble in which the real time reproduction data is recorded without ensuring the continuous reproduction and this results in the data loss at the time of the reproduction and thereby the data reproduction is disturbed.

Also, in order to attain the above-mentioned object, according to still another aspect of the present invention, there is provided a disc recording method for recording coded data to be reproduced in real time, on a recordable disc-shaped recording medium, the method comprising the steps of: detecting a maximum coding rate that is a reproduction peak rate of the coded data based on coding rate information of the coded data; detecting a recording start position of the disc-shaped recording medium; supposing that the coded data are recorded on the disc-shaped recording medium; detecting a length of a discontinuous portion of the coded data that are suppositionlly recorded; determining a possibility of continuous reproduction of the coded data that are suppositionlly recorded, based on at least information of the recording start position, the length of the discontinuous portion and the maximum coding rate; recording the coded data on the disc-shaped recording medium when it is determined that the coded data that are suppositionlly recorded can be continuously reproduced as the determination result; and changing the recording start position when it is determined that the coded data that are suppositionlly recorded can not be continuously reproduced.

Also, in order to attain the above-mentioned object, according to yet another aspect of the present invention, there is provided a disc recording method for recording coded data to be reproduced in real time, on a recordable disc-shaped recording medium, the method comprising the steps of: detecting a maximum coding rate that is a reproduction peak rate of the coded data based on coding rate information of the coded data; detecting a recording start position of the disc-shaped recording medium; supposing that the coded data are recorded on the disc-shaped recording medium; detecting a length of a discontinuous portion of the coded data that are suppositionlly recorded; determining a possibility of continuous reproduction of the coded data that are suppositionlly recorded, based on at least information of the recording start position, the length of the discontinuous portion and the maximum coding rate; recording the coded data on the disc-shaped recording medium when it is determined that the coded data that are suppositionlly recorded can be continuously reproduced as the determination result; and rearranging recorded areas on the disc-shaped recording medium when it is determined that the coded data that are suppositionlly recorded can not be continuously reproduced.

According to the present invention, for example, in the case that real time reproduction data is to be recorded together with another data on a recordable disc medium, the real time reproduction data can be surely recorded together with another data on the recordable disc medium, and it is also possible to ensure the reproduction of the real time reproduction data, and further possible to avoid the occurrence of the disturbance in the data reproduction.

The preferred embodiment of the present invention further comprises the step of outputting a message indicating that the coded data can not be recorded, after it has been repeatedly determined a predetermined number of times that the coded data that are suppositionlly recorded can not be continuously reproduced.

According to this embodiment, for example, it is possible to avoid the trouble in which the real time reproduction data is recorded without ensuring the continuous reproduction and this results in the data loss at the time of the reproduction and thereby the data reproduction is disturbed.

The nature, principle and utility of the invention will become more apparent from the following detailed description when read in conjunction with the accompanying drawings.

DESCRIPTION OF THE PREFERRED EMBODIMENTS

The basic concept of the present invention will be described below before the explanation of the actual configuration of a disc recorder in this embodiment to which a disc recorder and method of the present invention is applied.

The disc recorder and method of the present invention, when recording on a recordable disc medium a real time reproduction data, which is compressed and encoded, for example, by using the MPEG system or the like, together with another data (for example, reading out a real time reproduction data recorded on another recording medium and then copying to a disc medium), firstly determines, supposing that the real time reproduction data are recorded on the disc medium, whether or not the real time reproduction data can be continuously reproduced, and then controls the actual record (copy) of the real time reproduction data in accordance with the determination result.

Here, it may be considered that the data which are compressed and encoded by the MPEG system or the like has the variable transfer rate (the variable coding rate) as mentioned above. In other words, when data having a variable transfer rate (the variable coding rate) are read out from the disc medium for recording thereon the data, and the data are transiently stored in a decoder buffer memory, for example, by a predetermined data length, and then the data read out from the buffer memory at a constant transfer rate are decoded, for example, if the operation for reading out the data from the disc medium is transiently stopped because of a file of another data, a defect or the like, this indicates that a time for which the buffer memory can be maintained at a non-underflow state is variable, in a course of decoding the data read out from the buffer memory at the constant transfer rate.

Figure 1:
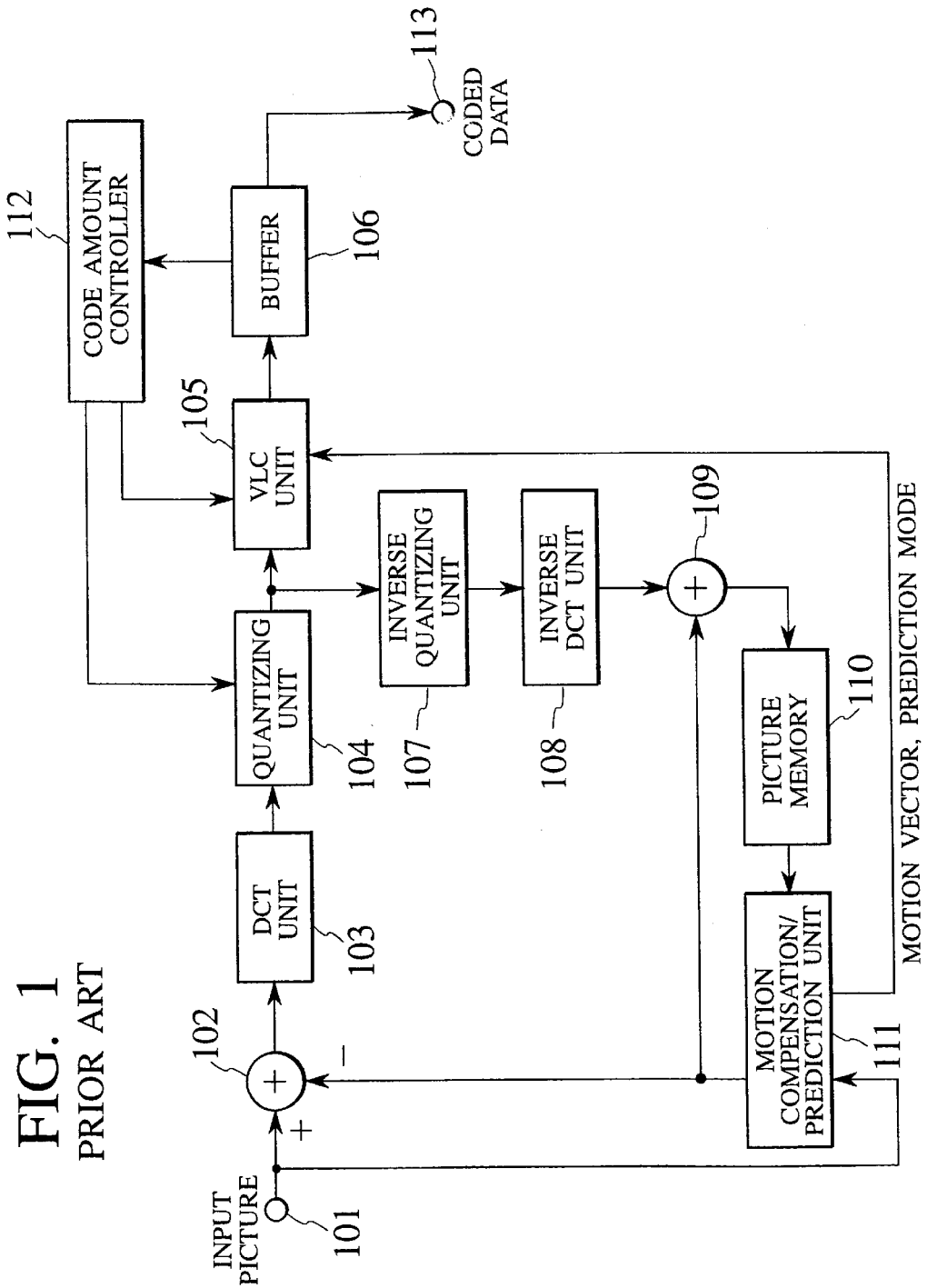
FIG. 1 is a block diagram showing a schematic configuration of a conventional video encoder.
Figure 2:
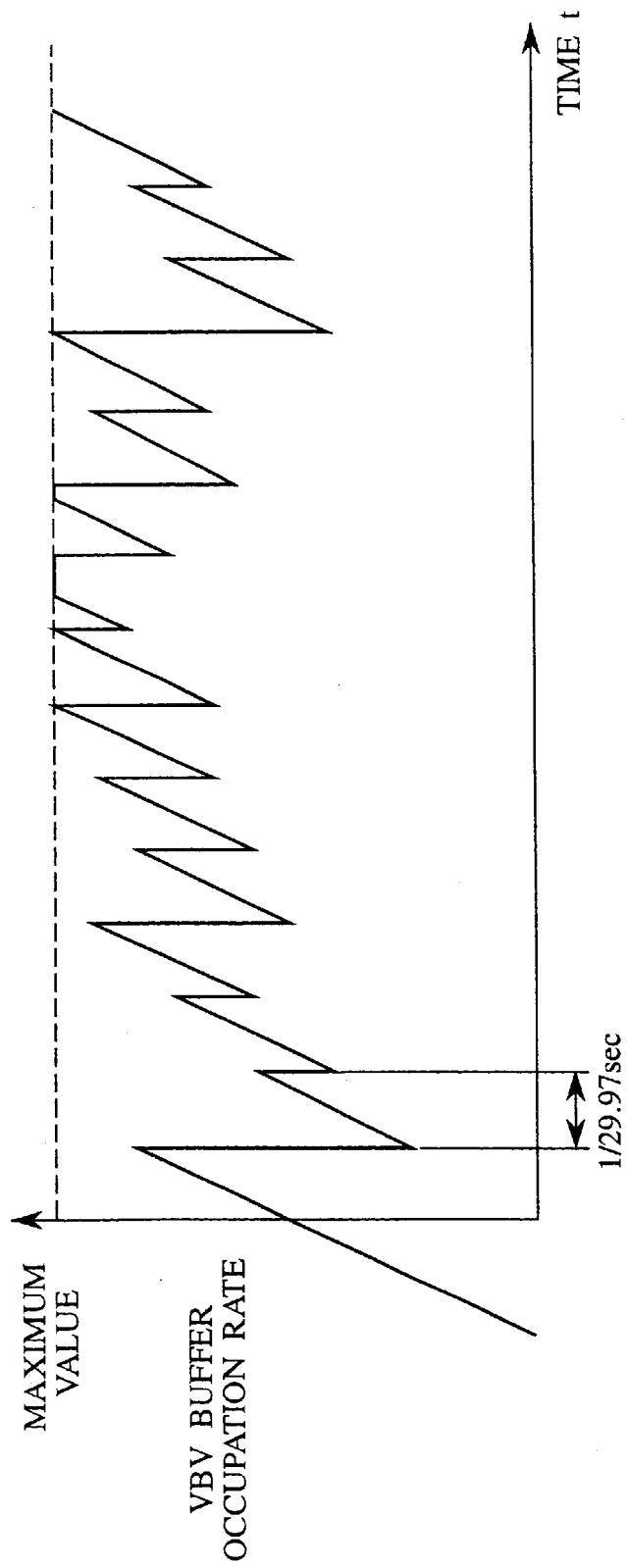
FIG. 2 is an explanatory diagram showing a transition of a buffer occupation value of a VBV buffer.
Figure 3:
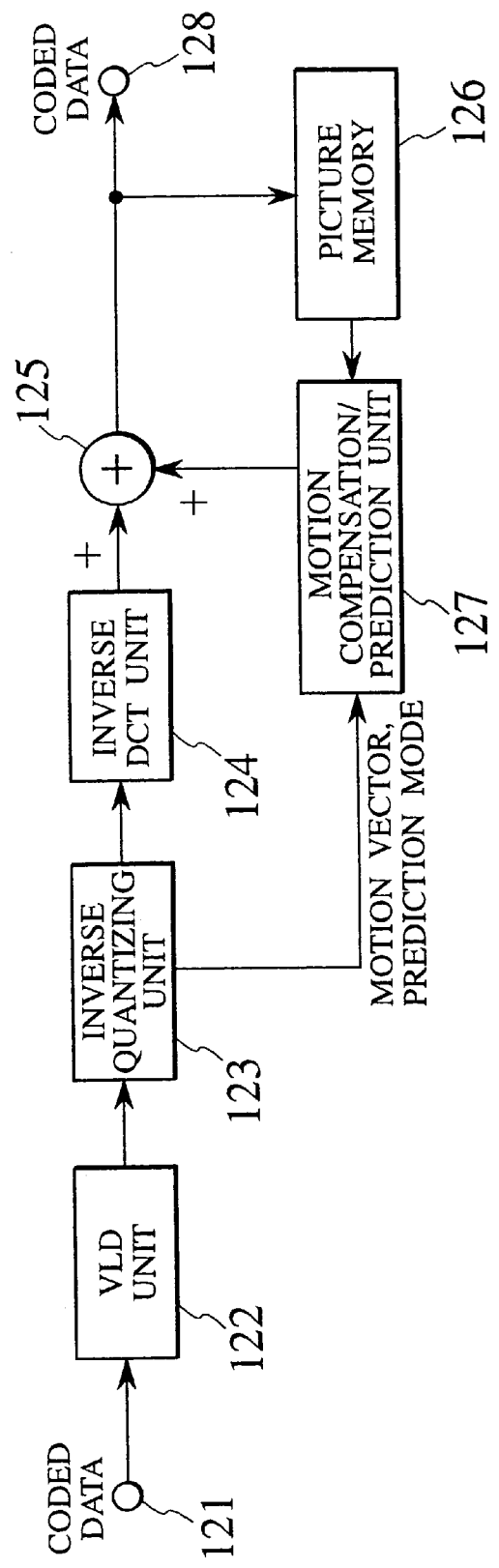
FIG. 3 is a block diagram showing a schematic configuration of a conventional video decoder.
Figure 4:
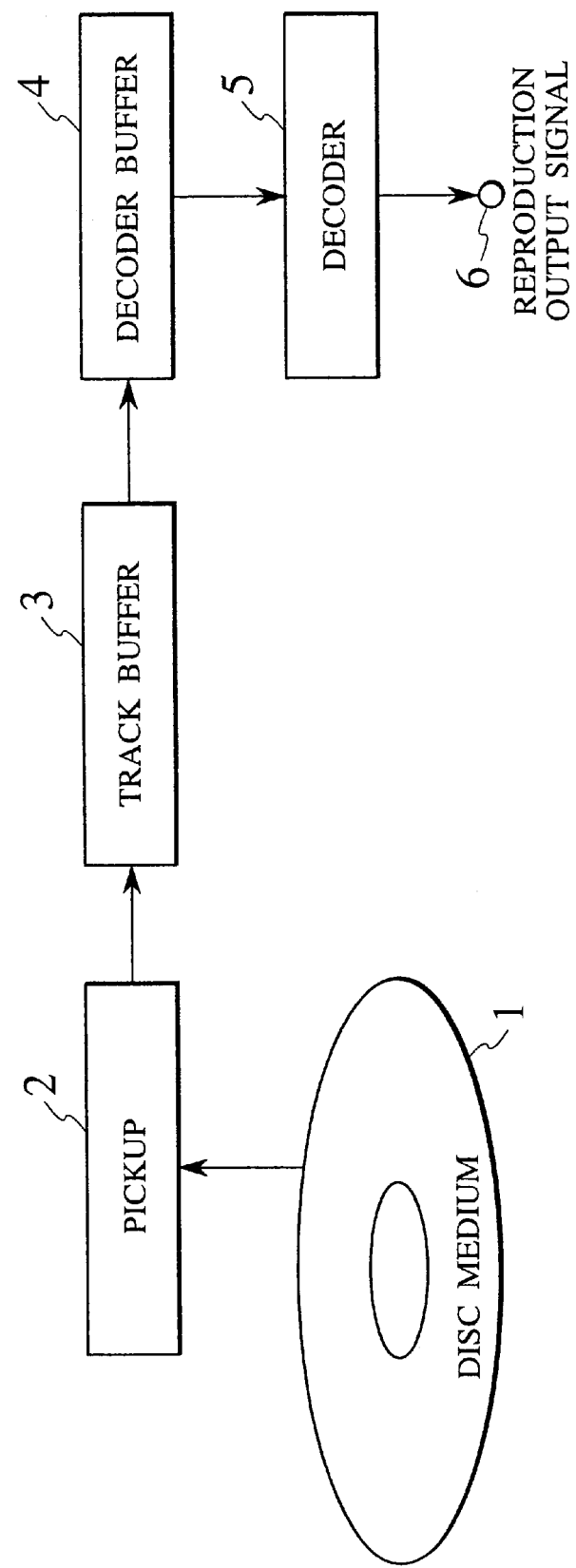
FIG. 4 is a block diagram showing a basic configuration for reproducing, decoding and outputting a real time reproduction data recorded on a disc medium.

Hereafter, for example, let us consider the following configuration. As shown in FIG. 4, when the real time reproduction data, in which a transfer rate is made variable by the compressing and encoding operation of the MPEG system or the like, are recorded on a disc medium 1, the real time reproduction data are read out from the disc medium 1 by a pickup 2, and transiently stored in a track buffer memory 3. Then, the data are transferred to a decoder buffer memory 4 when the track buffer memory 3 reaches a predetermined occupation amount. And, the data are decoded by a decoder 5 in accordance with the above-mentioned MPEG VBV buffer standard, thereby obtaining a reproduction output signal. In the example of FIG. 4, the track buffer memory 3 and the decoder buffer memory 4 are described as the two memories. However, those buffer memories may be integrated into a single unit. In the explanation from now, it is assumed that the track buffer memory 3 and the decoder buffer memory 4 are integrated into the single unit, and it is defined as an input buffer.

The transition of the buffer occupation amount resulting from a data input to the input buffer having the above-mentioned configuration shown in FIG. 4 will be described below with reference to FIG. 5.

Figure 5:
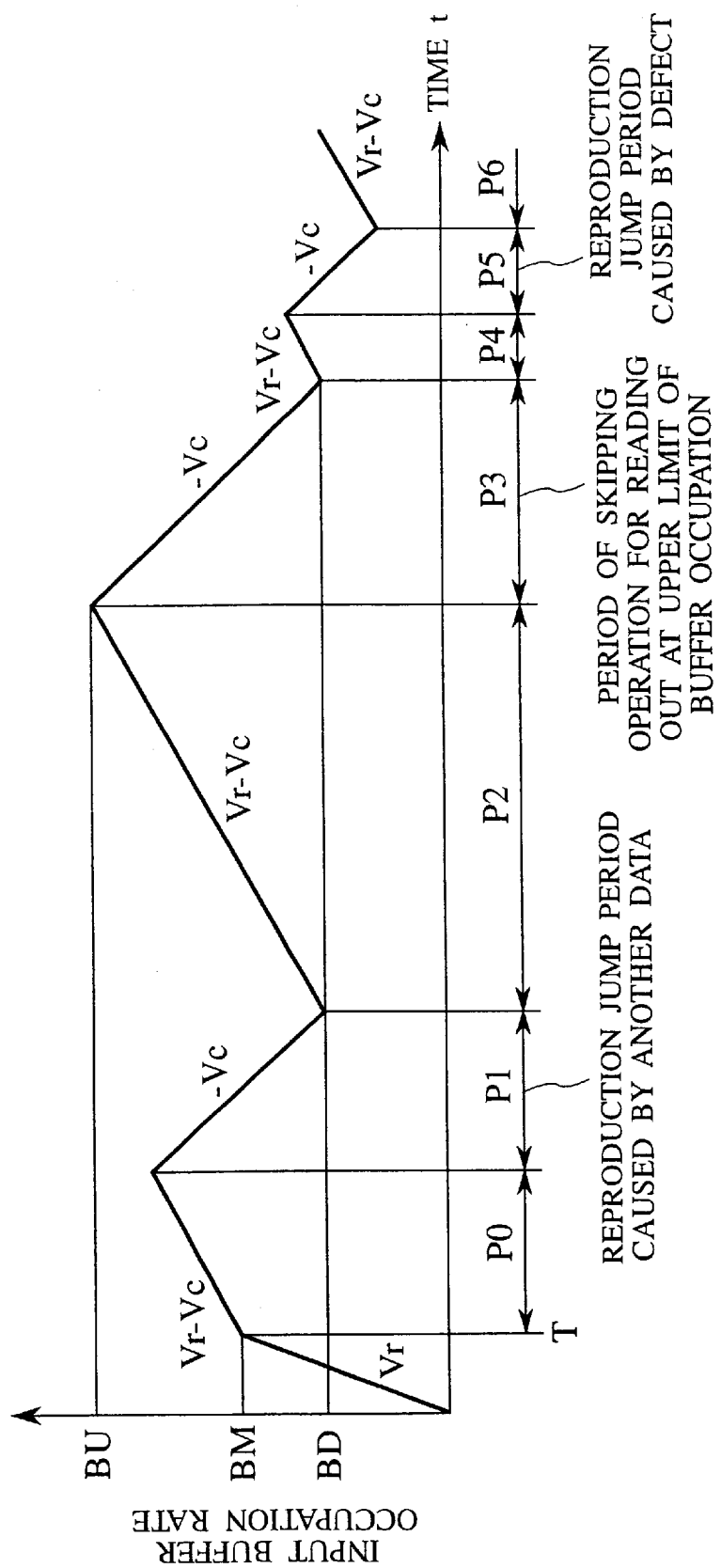
FIG. 5 is a view explaining a transition of a buffer occupation amount resulting from a data input to an input buffer in the configuration shown in FIG. 4.

In FIG. 5, data are firstly inputted to the input buffer at a rate corresponding to a reading rate Vr from the disc medium 1. The data are read out from the input buffer at a point T when the input buffer reaches a predetermined buffer occupation amount BM. Then, a decoding operation in the decoder 5 is started.

Here, a speed of the decoding operation in the decoder 5 depends on a coding rate of a data. When the coding rate is defined as Vc (Vr>Vc), a buffer occupation amount of the input buffer is increased at a rate corresponding to a difference between the reading rate Vr and the coding rate (Vr−Vc), in periods P0, P2, P4 and P6 in which the data input to the input buffer and the decoding operation in the decoder 5 are performed at the same time.

However, the data are not always read out from the disc medium 1. For example, if the real time reproduction data are not continuously arranged on the disc medium 1, namely, if the data are dispersed at physically separate positions although the data continuous in a file system, the pickup 2 seeks (jumps) up to a first address of a data to be next reproduced, at a physically discontinuous point of the real time reproduction data on the disc medium 1. Thus, the operation for reading out from the disc medium 1 is stopped only for the seeking period. In this way, in the period P1 when the operation for reading out the data from the disc medium 1 is stopped, the buffer occupation amount of the input buffer is reduced at the rate (−Vc) corresponding to the coding rate Vc.

Also, the operation for reading out the data from the disc medium 1 through the pickup 2 is transiently stopped if the buffer occupation amount is increased up to an upper limit BU of the input buffer. In the period P3 when the operation for reading out is transiently stopped, the buffer occupation amount of the input buffer is reduced at the rate (−Vc) corresponding to the coding rate Vc. After that, the operation for reading out the data from the disc medium 1 through the pickup 2 is resumed from an address at which the operation for reading out is transiently stopped, at a point when the buffer occupation amount of the input buffer is reduced to a predetermined value BD.

Moreover, if the defect is present on the disc medium 1 in the course of reading out the data from the disc medium 1, the reading out operation in the pickup 2 is also stopped although the stop period is short. In the period P5 when the operation for reading out is stopped because of the presence of the defect, the buffer occupation amount of the input buffer is reduced at the rate (−Vc) corresponding to the coding rate Vc.

Figure 6:
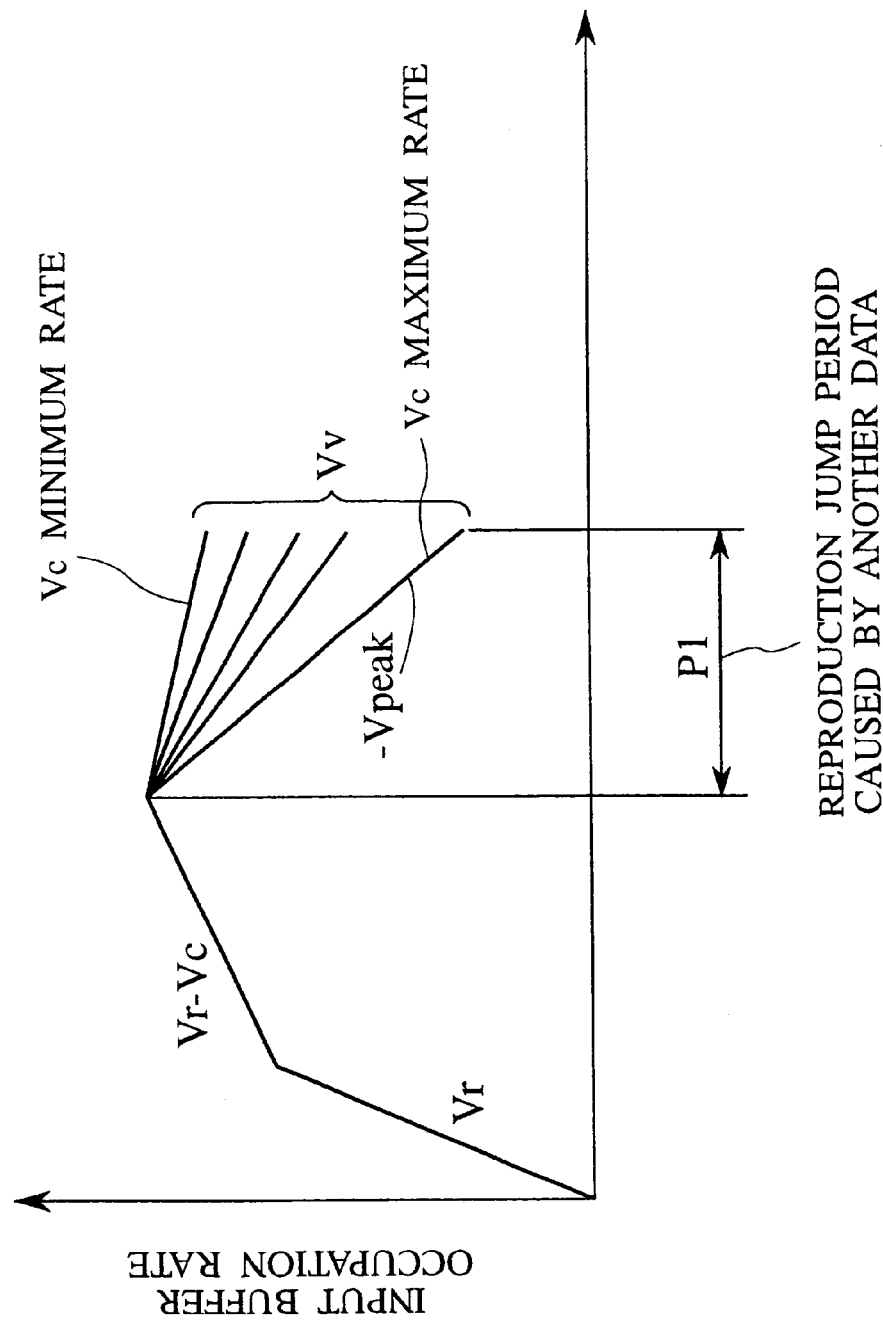
FIG. 6 is a view explaining that a drop rate of a buffer occupation amount, when data are outputted from an input buffer, depends on a variable coding rate to thereby be indefinite, if real time reproduction data are data having a variable transfer rate.

In the meantime, if the data to be recorded are the data having the variable transfer rate (variable coding rate) which are compressed and encoded by the MPEG system or the like, for example, as shown in FIG. 6, a drop rate Vv of the buffer occupation amount, when the data are outputted from the input buffer in the condition that the operation for reading out from the disc medium 1 through the pickup 2 is stopped, depends on a variable coding rate at its moment to thereby be indefinite. That is, in a case of the variable coding rate, its coding rate is varied between the minimum encode rate and the maximum encode rate. Thus, when the data having such a variable coding rate are outputted from the input buffer, the drop rate of the buffer occupation amount of the input buffer also corresponds to the rate depending on an coding rate of the data at the moment of its output.

However, for example, if the operation for reading out from the disc medium 1 is transiently stopped since the input buffer reaches the upper limit BU as indicated in the period P3 of FIG. 5, the operation for reading out is always resumed at a point when the buffer occupation amount is reduced to the predetermined value BD. Also, if the operation for reading out from the disc medium 1 is transiently stopped because of the presence of the defect on the disc medium 1 as indicated in the period P5 of FIG. 5, the stop period is short, which may result in a small problem even if the drop rate of the buffer occupation amount depends on the variable coding rate and is indefinite.

However, if a reproduction jump to skip another data is required as indicated in the period P1 of FIG. 5 (the period P1 of FIG. 6), a length of a reproduction jump period to skip another data is indefinite. Thus, for example, when the real time reproduction data of the variable coding rate recorded on the disc medium 1 is reproduced, especially for example, if the reproduction jump period to skip another data is long, or if the drop rate of the occupation amount of the input buffer is high (the coding rate of the data is high), there may be a fear that the input buffer becomes in the underflow state.

In view of the above-mentioned problems, the disc recorder and recording method of the present invention records on the disc medium 1 the real time reproduction data having a variable transfer rate (coding rate) so that the input buffer does not underflow at a time of a future reproduction, even if another data are scattered on the disc medium 1.

Also, the present invention pays attention to the fact that a period in which the drop rate Vv of the buffer occupation amount, when the data are outputted from the input buffer, reaches a maximum under a state that the operation for reading out from the disc medium 1 is stopped, is a period of the maximum coding rate of the variable transfer rate (variable coding rate). Thus, the present invention assumes that any part of the data having the variable transfer rate (variable coding rate) is encoded at the maximum coding rate and that the drop rate Vv of the buffer occupation amount of the input buffer is a peak rate $V_{peak}$ corresponding to the maximum coding rate. Then, the present invention uses the peak rate $V_{peak}$ as drop rate of the buffer occupation amount and thus performs a process for determining a possibility with regard to a later-described continuous reproduction.

The actual configuration of a disc recorder in a first embodiment of the present invention which determines the possibility of the continuous reproduction to thereby ensure the continuity in the reproduction of the real time reproduction data will be described below with reference to FIG. 7.

Figure 7:
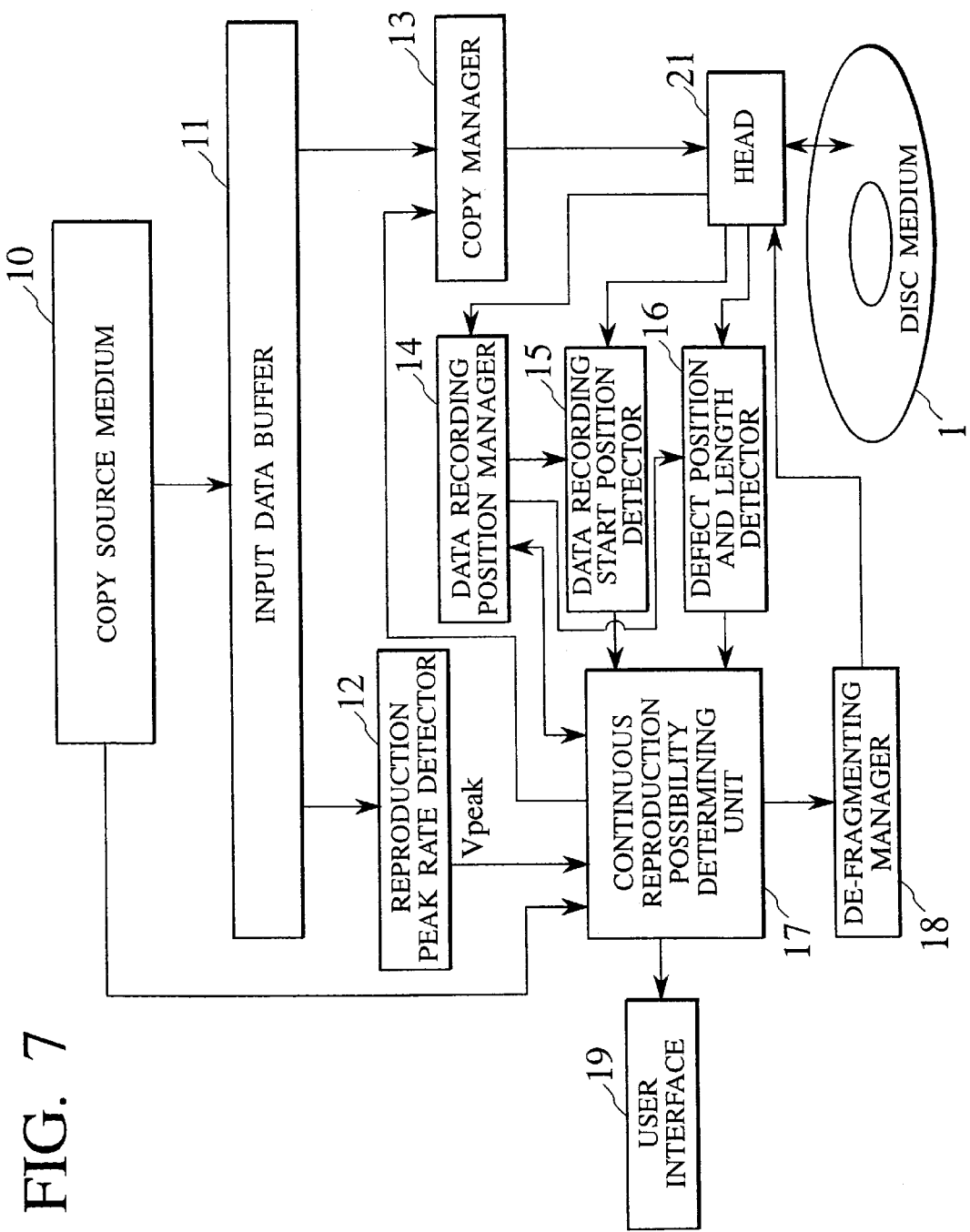
FIG. 7 is a block diagram showing a schematic configuration of a disc recorder in a first embodiment of the present invention.

In FIG. 7, a copy source medium 10 is, for example, a tape-shaped recording medium, a disc-shaped recording medium, a recording medium using a semiconductor memory or the like. The recording medium at least records thereon a real time reproduction data of a variable transfer rate (variable coding rate) which are compressed and encoded, for example, by the MPEG system or the like, and an information of the maximum coding rate of its variable rate.

The data recorded on the copy source medium 10 are read by a reproducing device (not shown). Incidentally, if the copy source medium 10 is a tape-shaped recording medium, for example, such as a magnetic tape, the reproducing device is constituted, for example, by a rotation head for reproducing data recorded in a slant record track recorded on the magnetic tape and the like. If the copy source medium 10 is a disc-shaped recording medium, such as a magnetic disc, for example, a hard disc or the like, the reproducing device is constituted, for example, by a magnetic head for reproducing data from the hard disc and the like. Moreover, if the copy source medium 10 is a disc-shaped recording medium, for example, such as an optical disc and the like, the reproducing device is constituted, for example, by a pickup for reproducing data from the optical disc and the like. If the copy source medium 10 is a recording medium, for example, using a semiconductor memory, the reproducing device is constituted, for example, by a reader of the semiconductor memory and the like.

The data reproduced from the copy source medium 10 by the reproducing device are once stored in an input data buffer memory 11.

A reproduction peak rate detector 12 detects the peak rate $V_{peak}$ described in FIG. 6 which corresponds to the above-mentioned maximum encode rate, based on the data stored in the input data buffer memory 11, before the real time reproduction data reproduced from the copy source medium 10 are actually recorded on (copied to) the disc medium 1.

Here, although the information of the maximum coding rate for detecting the peak rate $V_{peak}$ is arranged in various conditions in accordance with a format and a kind of the copy source medium 10, the reproduction peak rate detector 12 can detect the information of the maximum coding rate arranged in the various conditions. For example, if the information. of the maximum coding rate is arranged at a header portion of the data reproduced from the copy source medium 10, the reproduction peak rate detector 12 analyzes the header portion, obtains the information of the maximum coding rate, and then detects the peak rate $V_{peak}$ from this maximum coding rate. Also, for example, if the data recorded on the copy source medium 10 are MPEG data, picture data and audio data are basically multiplexed in the MPEG data, and its multiplexing rate is recorded in a system header of the MPEG. Hence, the reproduction peak rate detector 12 analyzes the system header, and obtains the information of the maximum coding rate, and then detects the peak rate $V_{peak}$ from the maximum coding rate. Especially, if the data recorded on the copy source medium 10 are MPEG data of a variable transfer rate including only picture data, it is prescribed in the MPEG that the maximum coding rate in its entire video bit stream is described in a sequence header of a video layer. Hence, the reproduction peak rate detector 12 analyzes the sequence header of the video layer, obtains the information of the maximum coding rate, and then detects the peak rate $V_{peak}$ from the maximum coding rate.

The information of the peak rate $V_{peak}$ detected by the reproduction peak rate detector 12 as mentioned above is sent to a continuous reproduction possibility determining unit 17.

On the other hand, a data recording position manager 14 reads the information of a recorded area, a non-recorded area, a file allocation table and the like, through a recording/reproducing head 21 from a management area allocated, for example, on the innermost recording area on the disc medium 1 serving as a copy destination, and holds those information. Also, in accordance with the information read from the management area on the disc medium 1, the data recording position manager 14 manages the positions, on which data are recorded and from which data are reproduced, on the disc medium 1. Among the information held by the data recording position manager 14, a position information (address) of another data already recorded on the disc medium 1 serving as the copy destination and its length information (Lo byte) are sent to the continuous reproduction possibility determining unit 17.

Also, in accordance with the information held by the data recording position manager 14 and the information read from the disc medium 1 serving as the copy destination through the recording/reproducing head 21, a data recording start position detector 15 detects a data recording start position (address) on which real time reproduction data from the copy source medium 10 is to be recorded. The data recording start position information (address) detected by the data recording start position detector 15 is sent to the continuous reproduction possibility determining unit 17.

Moreover, in accordance with the information held by the data recording position manager 14 and the information read from the disc medium 1 serving as the copy destination through the recording/reproducing head 21, a defect position and length detector 16 detects a position (address) of a defect existing on a record surface of the disc medium 1 serving as the copy destination and a length of the defect (Ld byte). The position information (address) of the defect and the length information (Ld byte) of the defect detected by the defect position and length detector 16 are sent to the continuous reproduction possibility determining unit 17.

The continuous reproduction possibility determining unit 17 is supplied with a transfer rate from the copy source medium 10 also. Then, it is determined, for example, by using a first or second determination method described below, whether or not the continuous reproduction can be done, supposing that the real time reproduction data sent from the copy source medium 10 are recorded on the disc medium 1, in accordance with the transfer rate, a maximum seeking time ($T_{max}$) of the recording/reproducing head 21 determined in advance in the system, the information of the peak rate $V_{peak}$ from the reproduction peak rate detector 12, the data recording start position information (address) from the data recording start position detector 15, the defect position information (address) and the defect length information (Ld byte) from the defect position and length detector 16, the position information (address) of another data and its length information (Lo byte) from the data recording position manager 14.

The method for determining the possibility of the continuous reproduction in the continuous reproduction possibility determining unit 17 will be described below.

The continuous reproduction possibility determining unit 17 determines the possibility of the continuous reproduction through the following simulation. Specifically, the continuous reproduction possibility determining unit 17 imaginarily records the real time reproduction data from the copy source medium 10 stored by the input data buffer memory 11, from the data recording start position of the disc medium 1 serving as the copy destination and predicts whether or not the input buffer illustrated in FIG. 4 (the track buffer memory 3 and the decoder buffer memory 4) underflows if the real time reproduction data are reproduced from the data recording start position, and thus determines the possibility of the continuous reproduction based on the prediction result.

More specifically, the continuous reproduction possibility determining unit 17 determines the possibility of the continuous reproduction through the following simulation. That is, the continuous reproduction possibility determining unit 17 searches an area where the real time reproduction data can not be recorded continuously (discontinuous area) where the real time reproduction data can not be recorded continuously, for example, for the reason that another data have been already recorded or the defect is present, in a recording area on and after the data recording start position in which the real time reproduction data are recorded on the disc medium 1, and determines the length of the discontinuous portion. Then, the continuous reproduction possibility determining unit 17 determines, if the real time reproduction data recorded in the recording area on and after the data recording start position are reproduced, whether or not the input buffer (the track buffer memory 3 and the decoder buffer memory 4) underflows while the recording/reproducing head 21 (the pickup 2 of FIG. 4) is jumping over those discontinuous areas.

Basically, as a recording plan when data are recorded on the disc medium 1, any recording plan may be established if it depends on a typical file system. However, the recording plan is typically established in many cases so as to reserve the recording areas by linking portions in which jump distances are not excessively long. Thus, also in this embodiment, the continuous reproduction possibility determining unit 17, when determining the possibility of the continuous reproduction, assumes the case in which the real time reproduction data are recorded in accordance with such a typical recording plan, and then determined whether or not the above-mentioned input buffer (the track buffer memory 3 and the decoder buffer memory 4) underflows.

The method of determining the possibility of the continuous reproduction in the continuous reproduction possibility determining unit 17 will be described in detail below with reference to FIG. 5.

In the following explanation, let us consider the following case, as the simulation for the continuous reproduction possibility determining unit 17 to determine the possibility of the continuous reproduction. That is, in the case that the real time reproduction data are recorded in the recording area on and after the data recording start position on the disc medium 1 serving as a copy destination and then the real time reproduction data are reproduced from the data recording start position, it is supposed that an operation for reading out data is started while data are written to the input buffer, at a point T in time when the real time reproduction data reproduced from the disc medium 1 is entered by about 60% (the predetermined buffer occupation amount BM) of the buffer occupation amount of the input buffer (the track buffer memory 3 and the decoder buffer memory 4) described in FIG. 4.

Here, as described in FIG. 5, in the periods P0, P2, P4 and P6 when the data is read out while the data is written to the input buffer, the buffer occupation amount of the input buffer is increased at the rate (Vr–Vc) corresponding to the difference between the reading rate Vr from the disc medium 1 and the coding rate Vc of the real time reproduction data. Also, as described in FIG. 5, the buffer occupation amount of the input buffer is decreased at the rate (–Vc) corresponding to the coding rate Vc, in the periods P1 and P5 when the recording/reproducing head 21 (the pickup 2 of FIG. 4) seeks (jumps to) the first address of the data to be next reproduced, at the physically discontinuous point of the real time reproduction data on the disc medium 1.

However, as mentioned above, the coding rate Vc is variable in rate since the real time reproduction data are the data having the variable transfer rate (variable coding rate). Thus, it is very difficult to actually predict the rate corresponding to the (Vr–Vc) or the (–Vc).

For this reason, as mentioned above, the continuous reproduction possibility determining unit 17 in this embodiment, employs the peak rate $V_{peak}$ corresponding to the maximum coding rate as the coding rate Vc, and uses this peak rate $V_{peak}$, and then determines the variation (Vr–$V_{peak}$) and (–$V_{peak}$) in the buffer occupation amount when the data are read out while the data are written to the input buffer. In this embodiment, the complex process of the variable transfer rate can be simplified by using the peak rate $V_{peak}$ as the drop rate of the buffer occupation amount, and then determining the possibility of the continuous reproduction.

Here, in the case that the real time reproduction data are reproduced from the disc medium 1, the condition as to whether or not the input buffer (the track buffer memory 3 and the decoder buffer memory 4) underflows while the recording/reproducing head 21 (pickup 2) jumps over the discontinuous areas caused by, for example, another data and the defect depends on whether or not a sufficient amount of data are present in the input buffer before the execution of the jump.

That is, the condition for the input buffer (the track buffer memory 3 and the decoder buffer memory 4) not to underflow during the jump of the recording/reproducing head 21 (pickup 2) is that the data are present in the input buffer by the amount corresponding to the product ($T_{max} \times V_{peak}$) of the maximum seek time $T_{max}$ of the system implying the maximum time in the jump of the recording/reproducing head 21 (pickup 2) and the peak rate $V_{peak}$ implying the maximum rate when the occupation amount of the input buffer is decreased.

Thus, as the first determining method, the continuous reproduction possibility determining unit 17 determines the possibility of the continuous reproduction, depending on whether or not the data amount of the input buffer immediately before the start of the jump is equal to or greater than ($T_{max} \times V_{peak}$), as mentioned above. If the data amount of the input buffer immediately before the start of the jump is equal to or greater than ($T_{max} \times V_{peak}$), the continuous reproduction possibility determining unit 17 determines that the continuous reproduction is possible.

The first determination method determines the possibility of the continuous reproduction, depending on whether or not the buffer occupation amount of the input buffer immediately before the start of the jump is equal to or greater than the data amount consumed during the jump. On the other hand, as the second determination method different from the concept of the first determination method, the possibility of the continuous reproduction may be determined depending on whether or not the sufficient amount of data can be stored in the input buffer, prior to the position of the defect or another data to be jumped during the reproduction.

That is, as the second determination method, the continuous reproduction possibility determining unit 17 calculates a time required for the recording/reproducing head 21 (pickup 2) to jump over the discontinuous areas caused by another data and the defect, based on the lengths of another data and the defect, namely, the Lo (byte) and the Ld (byte) (here, collectively referred to as L (byte)) and the peak rate $V_{peak}$, and then calculates a data amount that can be stored in the input buffer when the data are read out while the data are written to the input buffer, within a time corresponding to the time for the jump, based on the difference (Vr–$V_{peak}$) between the reading rate Vr and the peak rate $V_{peak}$, and accordingly determines the possibility of the continuous reproduction, depending on whether or not data corresponding to the data amount are present on the record areas before the actual start of the jump (the areas from which the data can be continuously reproduced prior to the discontinuous area).

More specifically, in the case of the second determination method, the continuous reproduction possibility determining unit 17 firstly calculates the time necessary for the jumps, based on the length L of the defect or another data to be jumped. Here, assuming that the time necessary for the jumps is T(L), T(L)=L/200000+160 (msec). Also, this may be determined by determining an execution data in advance and then accumulating in ROM and the like. Next, it is determined whether or not the length of an area which is located prior to another data or the defect and from which the data can be continuously reproduced is equal to or greater than (T(L)×$V_{peak}$). As the L, the Ld is used in a case of the length of the defect, and the Lo is used in a case of the length of another data. The second determination method may use a condition of whether or not continuous data are present prior to another data and the defect corresponding to a time of T(L)×$V_{peak}$/(Vr–$V_{peak}$) instead of the length of a continuous reproduction possible area.

As mentioned above, in the second determination method, the continuous reproduction possibility determining unit 17 determines the possibility of the continuous reproduction, depending on whether or not the length of the area which is located prior to the position to be jumped and from which the data can be continuously reproduced is equal to or greater than T(L)×$V_{peak}$. It determines that the continuous reproduction is possible if the length of the area which is located prior to the position to be jumped and from which the data can be continuously reproduced is equal to or greater than T(L)×$V_{peak}$.

The continuous reproduction possibility determining unit 17 uses the above-mentioned determination methods, and then determines the possibility of the continuous reproduction. If it is determined as the determination result that the continuous reproduction is impossible, this embodiment firstly changes the data recording position (data recording start position), as a first countermeasure, and accordingly avoids the real time reproduction data from being recorded in the area in which the continuous reproduction is impossible.

If it is determined that the real time reproduction data can not be recorded so as to be continuously reproduced though the data recording position (data recording start position) is changed as the first countermeasure, this embodiment de-fragments the recorded data on the disc medium 1 serving as the copy destination, as a second countermeasure, in other words, carries out a process for rearranging recording positions of a computer file and the like other than the real time reproduction data and files which are divided and scattered, and then reserves the area from which the real time reproduction data can be continuously reproduced on the disc medium 1.

Additionally, this embodiment may be designed such that the second countermeasure is executed if the area from which the real time reproduction data can be continuously reproduced can not be discovered on the disc medium 1 even after five trials of the first countermeasure.

That is, in this embodiment, if the continuous reproduction possibility determining unit 17 determines that the continuous reproduction is impossible, as the determination result of the possibility of the continuous reproduction as mentioned above, the continuous reproduction possibility determining unit 17 sends a signal to change the data recording start position to the data recording position manager 14, with the five times as a limit.

The data recording position manager 14, when receiving the signal to instruct the change of the data recording start position from the continuous reproduction possibility determining unit 17, shifts the data recording start position on the disc medium 1, for example, by 100 MB or more.

Also, the continuous reproduction possibility determining unit 17 employs the position shifted by 100 MB or more as a new data recording start position, and again determines the possibility of the continuous reproduction, as mentioned above. If the area from which the real time reproduction data can be continuously reproduced can not be discovered on the disc medium 1 even after the five trials of the operations for changing the data recording start position and for determining the possibility of the continuous reproduction, the continuous reproduction possibility determining unit 17 sends a signal to instruct the start of a de-fragmentation to a de-fragmenting manager 18.

The de-fragmenting manager 18, when receiving the signal to instruct the start of the de-fragmentation from the continuous reproduction possibility determining unit 17, controls the recording/reproducing head 21, and de-fragments the data on the disc medium 1 serving as the copy destination, in other words, rearranges the computer file and the like other than the real time reproduction data and the files which are divided and scattered, and then tries to reserve the continuous areas in the disc medium 1 as wide as possible.

After that, the continuous reproduction possibility determining unit 17 again determines the possibility of the continuous reproduction, for the disc medium 1 after the de-fragmentation. The continuous reproduction possibility determining unit 17, if determining that the continuous reproduction is possible as the result of the defragmentation, sends a data recording start position information and a copy starting signal to a copy manager 13.

The copy manager 13, when receiving the copy starting signal and the data recording start position information from the continuous reproduction possibility determining unit 17, reads out the real time reproduction data transiently stored in the input data buffer memory 11, and sends the data to the recording/reproducing head 21, and thus starts recording (copying) the data from the data recording start position on the disc medium 1.

Even though the de-fragmentation is carried out, if the continuous reproduction possibility determining unit 17 determines that the continuous reproduction is impossible on the disc medium 1 and thereby the real time reproduction data can not be recorded on (copied to) the disc medium 1, namely, if the area for the continuous reproduction of the real-time reproduction data can not be reserved on the disc medium 1, the continuous reproduction possibility determining unit 17 sends a control signal to a user interface 19.

The user interface 19 is provided with, for example, a monitor and a speaker. If receiving the control signal from the continuous reproduction possibility determining unit 17, it outputs a message indicating that the record (copy) is impossible to a user (a display of message characters and the like in a case of the monitor, and an output of message voices in a case of the speaker).

Figure 8:
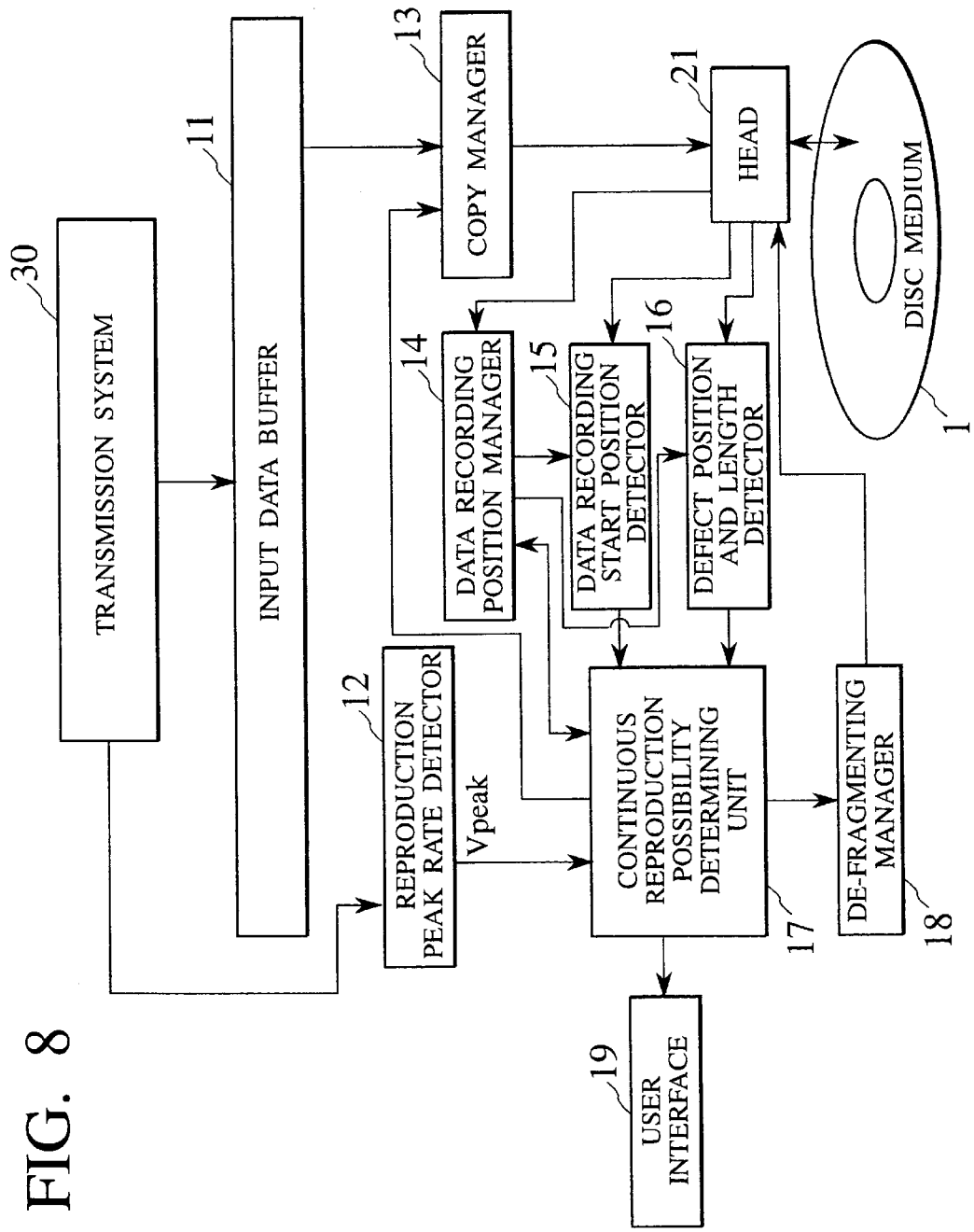
FIG. 8 is a block diagram showing a schematic configuration of a disc recorder in a second embodiment of the present invention.

The disc recorder and disc recording method of the present invention can be applied to not only the case in which the real time reproduction data are recorded on the tape-shaped recording medium, the disc-shaped recording medium, and the recording medium such as the semiconductor memory and the like (package medium), such as in the copy source medium 10 of the first embodiment shown in FIG. 7, but also a case in which the real time reproduction data are sent through a transmission system 30, as in a second embodiment shown in FIG. 8. In FIG. 8, the same reference symbols are given to the same components as the disc recorder of FIG. 7.

In FIG. 8, real time reproduction data from an encoder, such as the MPEG encoder or the like, and a real time reproduction data through a transmission medium, such as an electric wave, a light, a cable or the like, from a broadcasting station or a communicating station are sent to the transmission system 30.

Also, the maximum transfer rate (maximum coding rate), namely, the information of a peak rate is sent to the transmission system 30 from an encoder, an encoding condition input interface, a broadcasting station or a communicating station, before the real time reproduction data are recorded on the disc medium 1.

If the real time reproduction data are read out from the copy source medium 10 described in the above-mentioned example of FIG. 7, it is not necessary to consider the real time process, since the operation for reading out the data from the copy source medium 10 can be arbitrarily controlled. However, if the real time reproduction data are sent in real time through the transmission system 30 as described in the example of FIG. 8, it is too late if the possibility of the continuous reproduction is determined as mentioned above, after the maximum coding rate information and the multiplexing rate described in the header of the MPEG or the like, are detected in the real time.

For the above reason, in the case of the example of FIG. 8, before the real time reproduction data are recorded on the disc medium 1, the information of the maximum transfer rate (maximum coding rate) is received from the transmission system 30, for example, in a packet form of several bytes, and sent to the reproduction peak rate detector 12. Then, the real time reproduction data are received from the transmission system 30, for example, after an elapse of a predetermined time. Accordingly, the determination of the possibility of the continuous reproduction and the recording of the real time reproduction data onto the disc medium 1 can be attained similarly to the case of FIG. 7.

As mentioned above, according to the first and second embodiments of the present invention, when the real time reproduction data are recorded (copied) together with another data on (to) the recordable disc medium 1, the peak rate $V_{peak}$ of the real time reproduction data to be recorded is detected, and at least the data recording start position, the length of the defect and another data are detected with regard to the disc medium 1 on which the data are recorded. Then, it is determined whether or not the data can be recorded so as to be continuously reproduced, in accordance with the information of the data recording start position, the information of the length of the defect and another data. If it is determined that the data can be recorded, the recording operation is executed. If it is determined that the data can not be recorded, the data recording start position is changed, or the disc medium 1 serving as the copy destination is de-fragmented. As a result, the real time reproduction data recorded on the tape-shaped recording medium, the disc-shaped recording medium or the recording medium of the semiconductor device and the real time reproduction data outputted from an encoder or transmitted from a broadcasting station, a communicating station or the like can be surely recorded on the recordable disc medium 1 together with another data.

Also, according to the first and second embodiments of the present invention, the possibility of the continuous reproduction can be uniformly determined by using the peak rate $V_{peak}$. Thus, the possibility of the continuous reproduction can be determined easily as compared with the case of determining after detecting instantaneous and detailed rates of the variable transfer rate (variable coding rate).

Moreover, according to the first and second embodiments of the present invention, as the determination result of the possibility of the continuous reproduction as mentioned above, if it is determined that the real time reproduction data can not be recorded even after the several trials of the change of the data recording start position or even after the de-fragmentation of the disc medium 1 serving as the copy destination, the message indicative of the impossibility of the recording is outputted to a user. Thus, for example, it is possible to avoid the trouble in which the real time reproduction data are recorded without ensuring the continuous reproduction and this results in the data loss at the time of the reproduction and thereby the data reproduction is disturbed.

It should be understood that many modifications and adaptations of the invention will become apparent to those skilled in the art and it is intended to encompass such obvious modifications and changes in the scope of the claims appended hereto.

What is claimed is:

1. A disc recorder for recording coded data to be reproduced in real time, on a recordable disc-shaped recording medium, the disc recorder comprising:

a peak rate detecting means for obtaining coding rate information of the coded data to thereby detect a maximum coding rate that is a reproduction peak rate of the coded data;

a recording start position detecting means for detecting a recording start position of the disc-shaped recording medium;

a discontinuous length detecting means which, supposing that the coded data are recorded on the disc-shaped recording medium, detects a length of a discontinuous portion of the coded data that are suppositionlly recorded;

a determining means for determining a possibility of continuous reproduction of the coded data that are suppositionlly recorded, based on at least information of the recording start position, the length of the discontinuous portion and the maximum coding rate; and a control means for recording the coded data on the disc-shaped recording medium when it is determined that the coded data that are suppositionlly recorded can be continuously reproduced as the determination result of the determining means and for changing the recording start position when it is determined that the coded data that are suppositionlly recorded can not be continuously reproduced.

2. A disc recorder for recording coded data to be reproduced in real time, on a recordable disc-shaped recording medium, the disc recorder comprising:

a peak rate detecting means for obtaining coding rate information of the coded data to thereby detect a maximum coding rate that is a reproduction peak rate of the coded data;

a recording start position detecting means for detecting a recording start position of the disc-shaped recording medium;

a discontinuous length detecting means which, supposing that the coded data are recorded on the disc-shaped recording medium, detects a length of a discontinuous portion of the coded data that are suppositionlly recorded;

a determining means for determining a possibility of continuous reproduction of the coded data that are suppositionlly recorded, based on at least information of the recording start position, the length of the discontinuous portion and the maximum coding rate; and a control means for recording the coded data on the disc-shaped recording medium when it is determined that the coded data that are suppositionlly recorded can be continuously reproduced as the determination result of the determining means and for rearranging recorded areas on the disc-shaped recording medium when it is determined that the coded data that are suppositionlly recorded can not be continuously reproduced.

3. A disc recorder according to claim 1, further comprising a message output means for outputting a message indicating that the coded data can not be recorded, after the determining means has repeatedly determined a predetermined number of times that the coded data that are suppositionlly recorded can not be continuously reproduced.

4. A disc recorder according to claim 2, further comprising a message output means for outputting a message indicating that the coded data can not be recorded, after the determining means has repeatedly determined a predetermined number of times that the coded data that are suppositionlly recorded can not be continuously reproduced.

5. A disc recording method for recording coded data to be reproduced in real time, on a recordable disc-shaped recording medium, the method comprising the steps of:

detecting a maximum coding rate that is a reproduction peak rate of the coded data based on coding rate information of the coded data;

detecting a recording start position of the disc-shaped recording medium;

supposing that the coded data are recorded on the disc-shaped recording medium;

detecting a length of a discontinuous portion of the coded data that are suppositionlly recorded;

determining a possibility of continuous reproduction of the coded data that are suppositionlly recorded, based on at least information of the recording start position, the length of the discontinuous portion and the maximum coding rate;

recording the coded data on the disc-shaped recording medium when it is determined that the coded data that are suppositionlly recorded can be continuously reproduced as the determination result; and changing the recording start position when it is determined that the coded data that are suppositionlly recorded can not be continuously reproduced.

6. A disc recording method for recording coded data to be reproduced in real time, on a recordable disc-shaped recording medium, the method comprising the steps of:

detecting a maximum coding rate that is a reproduction peak rate of the coded data based on coding rate information of the coded data;

detecting a recording start position of the disc-shaped recording medium;

supposing that the coded data are recorded on the disc-shaped recording medium;

detecting a length of a discontinuous portion of the coded data that are suppositionlly recorded;

determining a possibility of continuous reproduction of the coded data that are suppositionlly recorded, based on at least information of the recording start position, the length of the discontinuous portion and the maximum coding rate;

recording the coded data on the disc-shaped recording medium when it is determined that the coded data that are suppositionlly recorded can be continuously reproduced as the determination result; and rearranging recorded areas on the disc-shaped recording medium when it is determined that the coded data that are suppositionlly recorded can not be continuously reproduced.

7. A disc recording method according to claim 5, further comprising the step of outputting a message indicating that the coded data can not be recorded, after it has been repeatedly determined a predetermined number of times that the coded data that are suppositionlly recorded can not be continuously reproduced.

8. A disc recording method according to claim 6, further comprising the step of outputting a message indicating that the coded data can not be recorded, after it has been repeatedly determined a predetermined number of times that the coded data that are suppositionlly recorded can not be continuously reproduced.

* * * * *